United States Patent
Bernas et al.

(10) Patent No.: US 7,362,699 B1
(45) Date of Patent: Apr. 22, 2008

(54) DATA DISTRIBUTION NETWORK AND METHOD FOR MANAGING A BREAKDOWN IN SAID NETWORK

(75) Inventors: Pierre Bernas, Palaiseau (FR); Christian Sannino, Toulouse (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/673,651

(22) PCT Filed: Feb. 25, 2000

(86) PCT No.: PCT/FR00/00471

§ 371 (c)(1),
(2), (4) Date: Nov. 2, 2000

(87) PCT Pub. No.: WO00/52857

PCT Pub. Date: Sep. 8, 2000

(30) Foreign Application Priority Data

Mar. 2, 1999 (FR) ................................. 99 02570

(51) Int. Cl.
*H04B 17/00* (2006.01)
(52) U.S. Cl. ................. 370/218; 370/222; 370/242
(58) Field of Classification Search .......... 370/216, 370/217–225, 242, 243, 400, 401, 402–403, 370/407–408, 228, 244, 245, 248–250, 360, 370/419–423; 709/223, 224, 225; 714/1, 714/2
See application file for complete search history.

(56) References Cited

U.S. PATENT DOCUMENTS

| | | | |
|---|---|---|---|
| 4,149,038 A * | 4/1979 | Pitroda et al. .............. 370/244 |
| 4,451,708 A * | 5/1984 | Kemler et al. ................. 379/2 |
| 4,847,837 A * | 7/1989 | Morales et al. ................ 714/4 |
| 4,884,263 A * | 11/1989 | Suzuki ....................... 370/225 |
| 5,142,532 A * | 8/1992 | Adams ....................... 370/432 |
| 5,276,440 A * | 1/1994 | Jolissaint et al. ....... 340/825.02 |
| 5,327,427 A * | 7/1994 | Sandesara ................... 370/222 |
| 5,442,630 A * | 8/1995 | Gagliardi et al. .......... 370/402 |
| 5,717,878 A | 2/1998 | Sannino |
| 5,724,343 A | 3/1998 | Pain et al. |
| 5,748,617 A * | 5/1998 | McLain, Jr. ................ 370/244 |
| 5,781,715 A * | 7/1998 | Sheu ............................. 714/4 |
| 5,923,743 A * | 7/1999 | Sklar ..................... 379/167.01 |
| 5,953,429 A * | 9/1999 | Wakai et al. ................. 381/77 |
| 5,978,353 A * | 11/1999 | Iwahori et al. ............ 370/217 |
| 6,201,995 B1 * | 3/2001 | Ying ............................. 700/3 |

(Continued)

*Primary Examiner*—Wing Chan
*Assistant Examiner*—Duc Duong
(74) *Attorney, Agent, or Firm*—Oblon, Spivak, McClelland, Maier & Neustadt, P.C.

(57) ABSTRACT

A device for distributing information and its fault management process which improves the robustness of a network, such as in an aircraft, a boat, or a train. The device or process includes one or more splitters of which an upstream input output is linked to a first end of a chain including stations, at lower overdimensioning cost, and with dynamic management of a fault which renders it transparent or of very short duration. A second end of the chain is linked to a downstream input output of another splitter and a fault management procedure is implemented activating or otherwise one of the ends of a chain depending on the nature and the conditions of the fault. Preferably, addresses of the elements of the network can reflect its topology and facilitate the shunting of the addresses of the stations between splitters.

23 Claims, 3 Drawing Sheets

U.S. PATENT DOCUMENTS 6,385,165 B1 * 5/2002 Kumata .................. 370/216
6,449,250 B1 * 9/2002 Otani et al. ............. 370/219
6,545,981 B1 * 4/2003 Garcia et al. ............ 370/242

* cited by examiner

DATA DISTRIBUTION NETWORK AND METHOD FOR MANAGING A BREAKDOWN IN SAID NETWORK

BACKGROUND OF THE INVENTION

1. Field of the Invention

The subject of the present invention is a network for distributing information and its fault management process. It is mainly usable in the field of telecommunications, especially in aeronautics. This invention could equally well be applied to ground-based telecommunications networks or in any other field such as the marine sector. The aim of the invention is to allow an increase in a reliability of such a network. With the invention, one increases a fault resistance of a network. The fault management process associated with the invention makes it possible to increase the stability whilst increasing the robustness of the network (load holding), thereby making it possible to reduce a risk of collapse thereof (severing of transmissions for some of the users of this network).

2. Discussion of the Background

At present, IFE type (In Flight Entertainment) telecommunications networks are found in aircraft cabins. These telecommunications networks makes it possible to offer passengers intangible services such as video on demand, music, television, Internet connection or more generally to send inquiries to a central unit without moving. This central unit has the job of supplying data, associated with a corresponding function across the network. A function can thus be a broadcast on a terminal available to a passenger of a requested program, a telephone call, an order for a product (drink, purchasing of duty-free goods) or any other function able to travel over a telecommunications network. One method of construction commonly employed to construct such a distribution network consists in adopting a star topology with several levels, in particular according to ARINC standard 628 part 4A. In such a construction, a first level consists of a central unit to which are linked, according to a point-to-point mode, information splitting devices. Each information splitting device comprises several inputs/outputs. An input/output is linked to a terminal by way of a bus. There are as many terminals as passengers.

Such a construction exhibits problems. In practice, the airline companies and more generally the operators of such networks are very sensitive to the availability rates of these items of equipment, which condition the degree to which their lines and their apparatuses are frequented. Thus, upon a fault of the network between a terminal and a splitting device, access to the services from this terminal is impossible. Moreover, if the fault occurs in a splitting device, then all the terminals which are linked to this device are inaccessible. Generally, faults in a network arise out of very harsh climatic and environmental conditions (vibrations, shocks) to which elements of the network are subjected. In practice, in most cases such a network is constructed from hardware which is envisaged mainly for ground-based use. In this ground-based use, one generally has stable climatic conditions. By contrast, with an aircraft, the climatic conditions are highly unstable. Thus, before a departure, during an aircraft parking phase, one may have a temperature of greater than +60° C. During a flight the temperature decreases to a value of the order of −50° C. On-landing the temperature may be +40° for example. These sizeable temperature variations are detrimental to correct operation of the constituent hardware of the network. This results in a possibly high fault rate.

Moreover, upon a fault, users of these terminals are generally moved to other terminals accessible from the central unit. Such a movement has the effect of creating an imbalance of the aircraft. This imbalance is generally compensated for through an increase in the speed of one of the engines of the craft, resulting in an increase in fuel consumption.

A common solution for testing the correct operation of terminals consists in bringing in tester users whose job is to test the terminals before each use of the aircraft. However, this solution is very unwieldy to implement by reason of a sizeable number of tester users which it requires and of the time for which the aircraft is grounded. This entails an increase in a maintenance cost of such a network. This solution can be applied only when the craft is on the ground. That is to say one does not intervene at the time the fault occurs but afterwards. Moreover, this checking operation merely has the aim of cataloging the terminals or splitting devices which are nonoperational.

SUMMARY OF THE INVENTION

The present invention proposes to remedy these problems by proposing an information distribution device for which a redundancy is created. This redundancy makes it possible to supply a terminal with two different influxes of information. Consequently, when one information influx is blocked, then one immediately switches an access path so as to use the other information influx. In this case a fault in an information splitting device is transparent or at the very least of short duration for a terminal linked to this splitting device. It is thus possible to increase the robustness of this network to faults. One thus avoids depriving the users of the system or moving them and creating imbalances in the craft. To do this, one uses an information splitting device of which one manner of operation is obtained for a bit rate below an allowable maximum bit rate. With this margin of available bit rate it is therefore possible to create a redundancy. When a splitting device develops a fault all the information which was destined for it is sent to a neighboring information splitting device. This neighboring information splitting device makes it possible to obtain the second information influx of a terminal. This picking up of the bit rate by this neighboring information splitting device is manifested as an increase in its bit rate. However, this surge in bit rate is easily absorbed since a splitting device possesses a bit rate margin.

The process of the invention actually makes it possible to limit the overdimensioning which produces this bit rate margin and to even out the bit rates of all the information splitting devices by splitting a bit rate surge applied to the neighboring information splitting devices. A consequence of this evening out of the bit rates is to increase a bit rate in the splitting devices by a lesser factor as compared with the nominal bit rate. With the process of the invention, a surge is applied to all the information splitting devices but this surge may be 50%, 33%, or 25% of the nominal bit rate, instead of 100% were all the surge to be shunted to the neighboring information splitting device.

The invention therefore relates to a network for distributing information, between a central unit and stations, comprising information splitting devices with inputs/outputs connected on the one hand to the central unit and on the other hand to the stations, an interface device in each station, characterized in that the interface device of each station is linked to a first splitting device and to a second splitting device.

It also relates to a process for splitting the effects of a fault in a network for distributing information among terminals characterized in that N splitting devices are linked, according to a star topology, to a central unit with the aid of transport means over each of which a primary stream travels, to a splitting device of rank m there corresponds a primary stream $FP_m$, the splitting devices are furnished with first inputs/outputs $A_1$ to $A_i$ and with second inputs/outputs $B_1$ to $B_j$, the first inputs/outputs $A_1$ to $A_i$ of a splitting device K are linked by buses $K_1$ to $K_i$ to the second inputs/outputs $B_1$ to $B_i$ of a consecutive splitting device K+1, with $1 \leq K \leq N$, terminals are linked in cascade to each bus $K_1$ to $K_i$, the first inputs/outputs $A_1$ to $A_i$ of the splitting devices 1 to N are activated, upon a fault between a terminal linked by a splitting device K to the central unit, a first input/output $A_1$ to $A_i$ of the splitting device K is deactivated, a second input/output $B_1$ to $B_i$ of the splitting device K+1 is activated.

BRIEF DESCRIPTION OF THE DRAWINGS

The invention will be better understood on reading the following description and on examining the figures which accompany it. These are presented merely by way of a wholly nonlimiting indication of the invention. The figures show.

DESCRIPTION OF THE PREFERRED EMBODIMENTS

Figure 1:
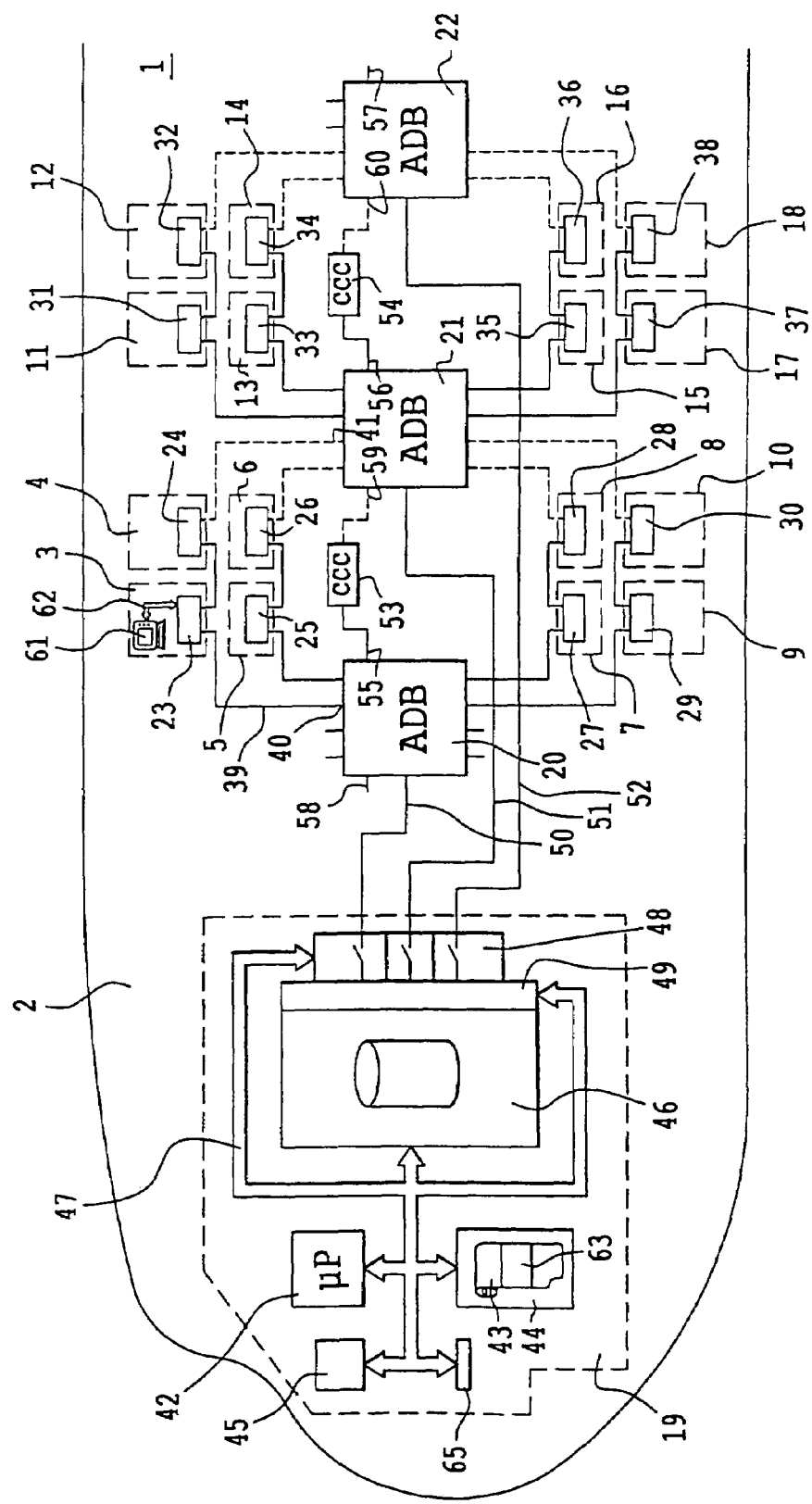
FIG. 1: a representation of the device of the invention.

FIG. 1 shows a diagrammatic representation of a network 1 for distributing information in an aircraft 2. It would be quite possible to have this network 1 according to the invention in a boat, a train or elsewhere. This network 1 comprises stations. A station essentially comprises a communications terminal and a communications interface device for one or more users. The communication terminal conventionally comprises a monitor, a keyboard and more generally multimedia means including a microphone and a loudspeaker. So as not to overburden the description, in one example, a number of stations restricted to sixteen, stations 3 to 18, has been used. This example does not constitute a limitation of the invention. In practice, such a network 1 for an aircraft can in reality comprise more than 500 stations (or fewer). The main function of these stations 3 to 18 is to receive information from a central unit 19. The function of this central unit 19 is to produce and monitor information exchanges over the network 1. This may involve a video-on-demand server, an encoder transforming images from a camera for example or any other means making it possible to supply information. The network 1 furthermore comprises intermediate load splitter nodes or information splitting devices 20, 21 and 22 which will subsequently be referred to as ADBs (Area Distribution Boxes) 20 to 22. Each ADB 20 to 22 comprises upstream inputs/outputs and downstream inputs/outputs. The ADBs 20 to 22 are linked on the one hand to the central unit 19 and on the other hand to the stations 3 to 18.

More precisely, each station 3 to 18 comprises interface devices 23 to 38 respectively. Thus, an ADB 20 to 22 effects a link between the central unit 19 and interface devices 23 to 38. In the invention, an interface device 23 to 38 is linked on the one hand to a first ADB 20 to 22 and on the other hand to a second ADB 20 to 22 which is different from the first ADB. Thus, an interface device 23 to 38 possesses two paths or means of access to the central unit 19. These accesses are complementary, that is to say when an interface device 23 to 38 is using one access path the other access path is deactivated.

A possible bit rate of a link between an ADB and a station makes it possible, in accordance with ARINC standard 628 part 4A in the case of networks in aeronautics, to have several stations on the link. To do this, several interface devices are linked in cascade by virtue of a bus, or a chain, one end of which is linked to the first ADB and another end of which to the second ADB. A chain is therefore a bus to which stations are linked in cascade (or in series). That is to say an output of a station is linked to an input of a following station. Hereinbelow, the term bus will be used to speak either of a bus or of a chain and the term cascade to speak of a cascaded or serial link. Thus, for example, the interface devices 23 and 24 are linked in cascade with a bus 39 a first end of which is linked to an upstream input/output 40 of the ADB 20 and a second end of which is linked to a downstream input/output 41 of the ADB 21.

An interface device such as the interface device 23 preferably comprises a means for detecting a fault relating to a problem on a link to which it is linked. Such a means of detection makes it possible to detect a fault between the interface device in which it is located and the upstream input/output to which the interface device is linked. Thus, if the means for detecting a fault of the interface device 24 detects a fault, this signifies that the link between the input/output 40 and the station 4 is broken. Then, according to the invention, the communication between the station 4 and the central unit 19 will be done by way of the ADB 21 by activating the input/output 41 and by deactivating the input/output 40.

In order for the central unit 19 to be informed of a fault, the fault-detection means of the interface device 24 comprises in a preferred example means for mutual acknowledgement with the central unit 19. In such mutual acknowledgement, the central unit 19 and the interface device periodically send one another protocol messages, the aim of which is simply to inform one another reciprocally regarding their correct availability. Should the interface device 23 be faulty, it will not be able to acknowledge a request originating from the central unit 19. The input/output 40 can then no longer serve as information influx for the station 3. Hence, the central unit 19 diverts a request to the station 3 by way of the ADB 20 into a request to the station 3 by way of the ADB 21 by using the input/output 41. If in this case the station 3 still does not acknowledge the request of the central unit 19, then this station will be regarded as defective and will therefore have to be deactivated by the central unit 19. More generally, the paths using defective splitters are invalid, given that the interface devices 23 and 24 are linked in cascade. If the device 23 develops a fault, the input/output 40 can no longer be used to send information to the interface device 24. Thus, even after having deactivated the station 3, the central unit 19 can only communicate with the station 4 by way of the downstream input/output 41 of the ADB 21. Through their organization, the protocol exchanges allow the central unit to determine whether a terminal is faulty, if its interface is faulty, or if the whole ADB is faulty. Transmission diversions are organized accordingly. The diversions are performed in a physical form (by switching circuits of the central unit) or in a functional form (by addressing the ADBs and their activated inputs/outputs so as to link terminals).

In order to carry out management of the inputs/outputs, the central unit 19 comprises a microprocessor 42, a management program 43 in a program memory 44, a data memory 45 and also an information memory 46, all these elements being linked by a bus 47. Thus, when the central unit 19 does not receive an acknowledgement from a station with which it wishes to communicate then the management program 43 commands the microprocessor 42 to select the ADB 21. The input/output 41 is activated in the ADB 21 so that information originating from the information memory 46 can be sent to the station 4. A main function of the information memory 46 is to be used as data server. In a variant there are several information memories such as 46 each possibly monitored by a microprocessor. Thus, the types of services offered and the amount of information available (programs) are increased and/or one ensures redundancy of a data server. Each station 3 to 18, each input/output and each ADB is identified by an address. The management program 43 stores in the data memory 45 all the addresses of the defective stations 3 to 18.

The central unit 19 is nevertheless not limited to such management operations. In a variant it could comprise an interface device (not represented) plugged into the bus 47. Additional communication means such as an antenna could thus be connected up to this interface device as could means used as additional information source such as for example a camera, the information from which would be transmitted by way of the central unit 19.

The network 1 furthermore comprises a device 48 for switching from a first ADB to a second ADB. In a preferred example this switching device 48 is in the central unit 19. The central unit 19 furthermore comprises an interface device 49 between the information memory 46 and the switching device 48. This interface device 49 taps off, when ordered by the microprocessor 42 by way of the bus 47, information from the information memory 46 and supplies it to the switching device 48. The switching device 48 is commanded by the microprocessor 42 by way of the bus 47 as a function of the address of the ADB for which the information is destined. Thus, the microprocessor 42 commands the switching device 48 so that the information tapped off by the interface device 49 is sent to the input/output 41 of the ADB 21 rather than to the input/output 40 of the ADB 20. The switch or switches comprise switching tables with the addresses of the elements of the network. These switching tables make it possible to steer an incoming or outgoing information item to the corresponding ADB.

In a variant, the switching obtained with the switching device 48 is carried out by a switch, or a set of switches, operating according to the Ethernet standard. In this case the interface device 49 has the job of shaping according to this Ethernet standard the information emanating from the information memory 46. Depending on the faults catalogued by the management program 43 and stored in the data memory 45, the microprocessor 42 modifies the values of the addresses in the switching tables of the switch or switches. The definition of the addresses, which themselves consist of one or several fields, makes it possible to reflect the topology of the network and to act on the modification of a field (for example, the ADB number) so as to shunt all the stations from one ADB to another.

In a preferred example, a transmission of information between an ADB and a station is done by means of a bus such as the bus 39 constructed with a cable having two twisted conductors. Such cables are sufficient to transmit information with a bit rate of the order of 100 Mbits/s. It would be quite possible to use any other type of medium such as in particular a coaxial cable or an optical fiber. Choosing a cable with two twisted conductors leads to an inexpensive solution. A link 50, 51 or 52 between the central unit 19 and the ADB 20, 21 or 22 respectively is constructed with an optical fiber. This link 50, 51 or 52 could equally well be constructed with any other means provided that this means permits information transmission at bit rates of the order of 800 Mbits/s.

The network 1 furthermore comprises special interface devices 53 and 54. Each special interface device serves to plug in a special terminal. A special terminal allows the execution of functions which differ, or are additional to those permitted to a normal terminal. In an aircraft, a special terminal is made available to a hostess or to a steward. Each ADB 20, 21 or 22 furthermore comprises an additional downstream input/output 55, 56 or 57 and an additional upstream input/output 58, 59 or 60 respectively. Hereinbelow, the term CCC 53 or CCC 54 (Common Cabin Console) will be used to designate the special interface device 53 or the special interface device 54 respectively. The CCC 53 is linked on the one hand, by a link, to the input/output 55 of the ADB 20 and on the other hand, according to the invention, by another link to the input/output 59 of the ADB 21. Likewise, the CCC 54 is linked on the one hand, by a link, to the input/output 56 of the ADB 21 and on the other hand, by another link, to the input/output 60. The CCC 53 or 54 receives requests emanating from the stations 3 to 10 or from the stations 11 to 18 respectively.

A station, for example the station 3, comprises a terminal 61 linked to the interface device 23 by way of a data bus 62, this bus 62 being managed by the interface device 23. The terminal 61 can take all possible forms. That is to say it can consist of a screen with a keyboard or else a touch screen or furthermore comprise a telephone or any other means of communication. In this example the terminal 61 consists of a screen and a keyboard. Thus, a user using this terminal 61 makes a request to a user linked to the CCC 53, or 54. To do this, the request is firstly transmitted from the station 61 to the interface device 23 via the bus 62. This request is then transmitted from the interface device 23 to the central unit 19. It is processed by the management program 43. The management program 43 which has recognized a request relating to a CCC, in particular the CCC 53, commands the microprocessor 42 accordingly. The microprocessor 42 sends the request to the CCC 53 by way of the ADB 20. Should a fault occur between the input/output 55 and the switching device 48, the request is then transmitted to the CCC 53 by way of the input/output 59 of the ADB 21. Should several stations wish to communicate together, the same information routing procedure as before is carried out. In normal operation, that is to say fault-free, and in one example, only the upstream inputs/outputs of an ADB 20, 21 or 22 are active. Thus, in a preferred example, a nominal bit rate of each ADB 20, 21 or 22 is equal to half a maximum bit rate which may travel through this ADB. This maximum bit rate is in particular reached when the upstream inputs/outputs and the downstream inputs/outputs are simultaneously active. This allows an ADB to be able to absorb a surge caused by a fault on a neighboring ADB or on a part of a link of a bus.

Figure 2:
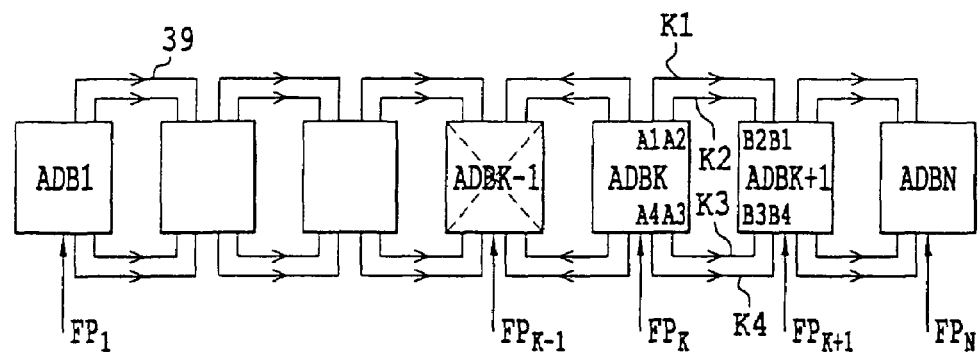
FIG. 2: a representation portraying a first solution for managing a fault of an ADB with the process of the invention.
Figure 3:
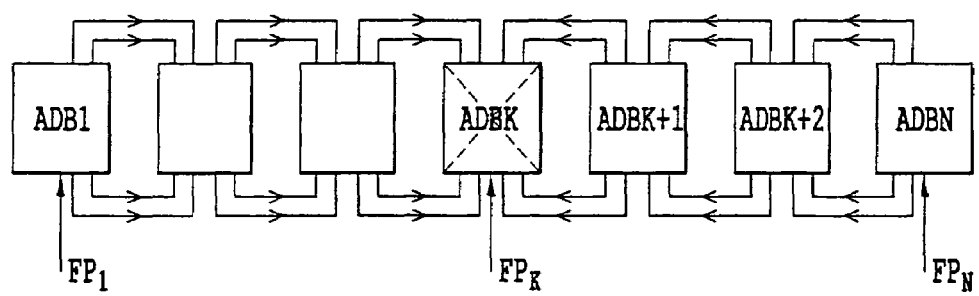
FIGS. 3 and 4: representations portraying a second and a third solution for managing faults with the process of the invention faced with one fault and then two faults respectively.
Figure 4:
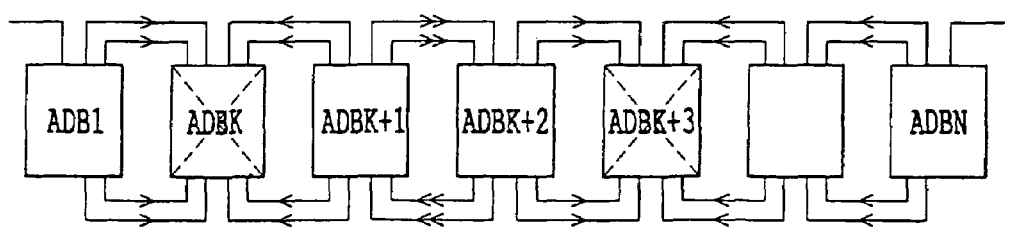

For this purpose, the present invention proposes a process for splitting the effects of a fault within such a network 1. FIGS. 2, 3 and 4 show how the process of the invention manages bit rate surges due to a fault with an interface, with an ADB or with a fault between an ADB and the central unit. These diagrammatic figures portray only ADBs and the buses such as 39 to which the interface devices are linked. These FIGS. 2, 3 and 4 portray only one direction of broadcasting of an information item emanating from the central unit on a bus. They illustrate that one of the two ADBs in charge of the bus. The buses, in FIGS. 2 to 4 and for the sake of clarity, do not comprise any stations.

FIG. 2 shows, in the case of a fault with an ADB K−1, a first fault management solution of the process of the invention. One considers N ADBs linked according to a star topology to a central unit (not represented) with the aid of transport means over each of which a primary stream FP travels. A primary stream $FP_m$ is made to correspond to an ADB of rank m. A splitting device is furnished with first inputs/outputs $A_1$ to $A_i$ and with second inputs/outputs $B_1$ to $B_j$. In a preferred example, the value 4 will be taken as the value of i. The first inputs/outputs $A_1$ to $A_i$ of a splitting device K are therefore linked by buses $K_1$ to $K_i$ to the second inputs/outputs $B_1$ to $B_i$ of a consecutive ADB K+1, with K lying between values 1 to N inclusive. Terminals are linked in cascade to each bus $K_1$ to $K_i$. In normal operation, that is to say fault-free operation, the first inputs/outputs $A_1$ to $A_i$ of the ADBs 1 to N are activated. An input/output is furnished, for example, with a breaker device. In this case, when an input/output $A_1$, for example, is active then the breaker device of the corresponding input/output $B_i$ is open and thus prevents communication between the relevant bus and the input/output $B_i$. The first inputs/outputs $A_1$ to $A_i$ will be referred to hereinbelow as the upstream inputs/outputs and the second inputs/outputs $B_1$ to $B_i$ will be referred to as the downstream inputs/outputs.

Should there be a fault with ADB K−1 or with the network feeding it, the upstream inputs/outputs of ADB K−1 of rank K−1 are deactivated with the aid of a microprocessor such as the microprocessor 42 (FIG. 1). The downstream inputs/outputs of the ADB of rank K are activated with the microprocessor 42. A consequence of this first solution of the process of the invention is to have a primary stream $FP_K$ of which a bit rate is equal to the maximum bit rate which an ADB can support.

This first solution, which works, has the effect of creating an imbalance in the splitting of the primary streams. In practice, all the primary streams are at a nominal bit rate except the primary stream $FP_K$ which is twice the bit rate of the nominal bit rate. This implies that the dimensioning of a bit rate of a stream must be at most twice the nominal bit rate if one wishes to serve the users, or less if one loses a part thereof.

An improvement to this first solution is shown in FIG. 3. Thus, in this second solution, upon a fault with the ADB of rank K, the microprocessor 42 commands the deactivation of all the upstream inputs/outputs of the ADBs of rank K to N. The microprocessor 42 activates all the downstream inputs/outputs of the ADBs of rank K+1 to N. In this case all the primary streams $FP_1$ to $FP_N$ are of equivalent bit rate, equal to the nominal bit rate.

A third solution, FIG. 4, consists, should there be a fault with the ADB of rank K, in activating only some of the upstream inputs/outputs of the ADB of rank K+1. All the downstream inputs/outputs of the ADB K+1 are activated so as to serve the stations normally served by the ADB K. For example the ADB K+1 takes charge of only two of its upstream inputs/outputs. The other two buses, normally linked to the upstream inputs/outputs of the ADB K+1, are taken charge of by the downstream inputs/outputs of the ADB K+2. This split produces two results. Firstly, the nominal bit rate of the ADB K+2 (and hence of an ADB in general), need not be twice the actual need. In the example it need be only 50% higher. The increase in bit rate is related to the number of ADBs (here 2: the ADBs K+1 and K+2) which are involved in countering the fault with an ADB. Secondly, beyond this number of involved neighboring ADBs, the network can allow an additional fault, for example that with the ADB K+3.

The second solution will be preferred in the case of a single fault. The third solution is advantageous in the case where several faults occur, or else if the ADB at the downstream end of the chain has an active role in the normal mode (some of its upstream inputs/outputs are linked to stations by a bus) but with no redundancy. More generally one chooses the solution which is best tailored as a function of a desired maximum bit rate or according to a strategy, for example implementation in an automaton.

In this case with the process of the invention one determines how many ADBs are functioning between a defective ADB of rank K and a defective ADB of rank K±n. Thus, knowing a number of buses to be fed between these two ADBs, the program 63 (FIG. 1) determines a number of upstream inputs/outputs and a number of downstream inputs/outputs to be activated for each of these functioning ADBs. The microprocessor 42 then activates the upstream inputs/outputs and the downstream inputs/outputs are determined. This last solution has the advantage of splitting a surge of bit rate of the faulty ADB or ADBs. This split makes it possible to even out the bit rates of the primary streams and thus simplify an operation of a central unit to which the ADBs are linked.

Figure 5:
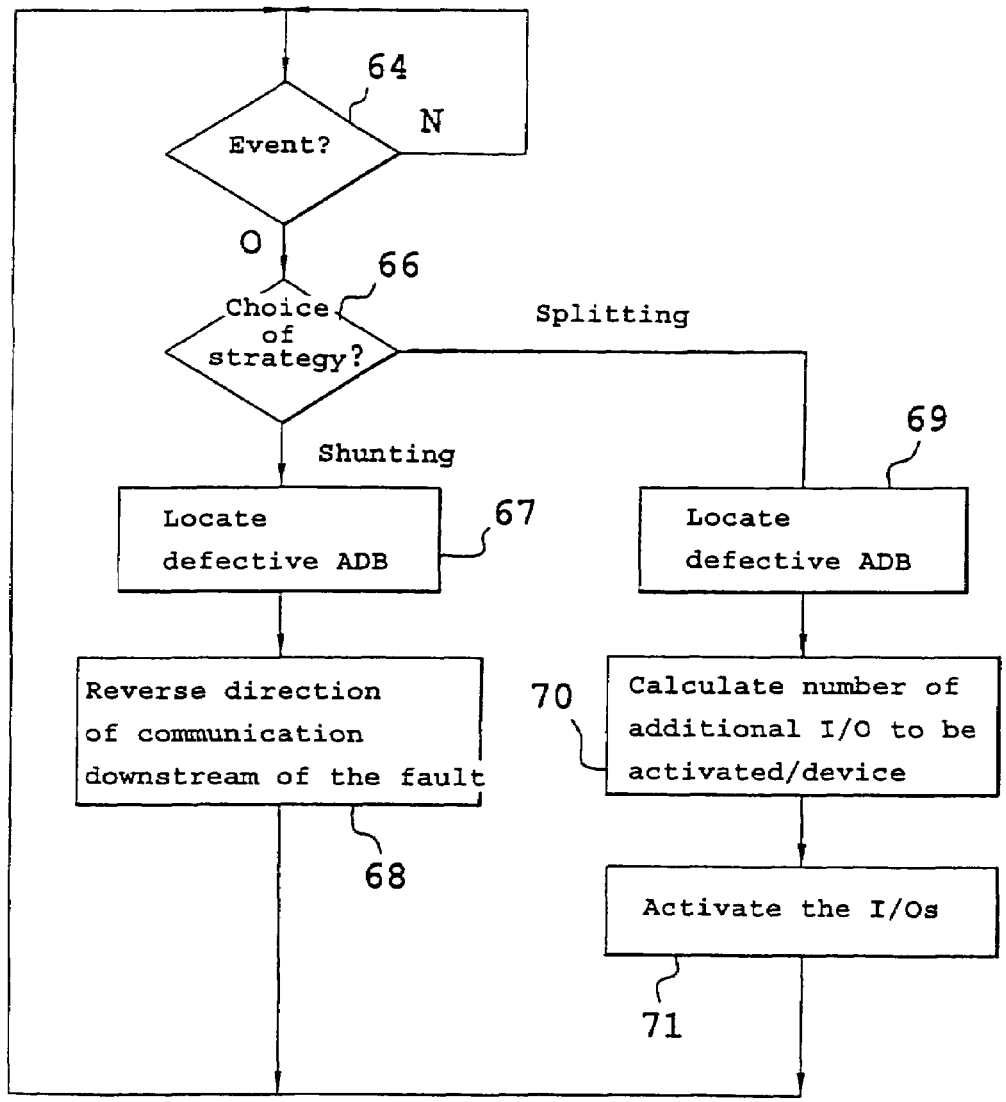
FIG. 5: a description, in algorithm form, of the process of the invention.

FIG. 5 illustrates in the form of an algorithm the various steps carried out by the process of the invention. A first step 64 corresponds to a waiting step of the process. During this step 64 the program 63 waits for the management program 43 to indicate that it has just detected an event, for example a fault. In this case the process of the invention increases by one unit a value in a register 65 for counting a number of faults in the central unit 19 (FIG. 1). The process of the invention then carries out a step 66 of choosing a strategy. If shunting is chosen then the process of the invention instigates a step 67. The defective ADB is located in this step 67. That is to say a value of K or more precisely of the address K is sought. Once this has been carried out, the process initiates a step 68 in which it will command, by way of the microprocessor 42, the deactivation of all the upstream inputs/outputs of the ADBs of rank K to N and the activation of all the downstream inputs/outputs of the ADBs of rank K+1 to N. The process of the invention therefore applies the second solution described earlier. The location of the defective ADB, that is to say the value of K, has been stored in the data memory 45.

In the case where the test carried out in step 66 indicates a strategy of fault splitting around the defective ADB, then a step 69 is instigated instead of the step 67. During this step 69 the defective ADB is located by searching for the value of the rank K±n of the faulty ADB. Once found, this value of K±n is saved in the data memory 45. Next comes a step 70 during which the program 63 determines, as a function of the address of the ADB of rank K and of the ADB of rank K±n a number of upstream inputs/outputs and a number of downstream inputs/outputs to be activated for the ADBs which are operational. After this step 70, begins a step 71 during which the microprocessor 42 commands the activation of the upstream inputs/outputs and of the downstream inputs/outputs thus determined. After the steps 68 or 71 the process of the invention returns to the waiting step 64.

In this description of the various steps of the process of the invention, the events were regarded as being faults. In fact, it would be possible to have events of all sorts such as those related to maintenance of the network for example or any other function requiring disconnection of an ADB. That is to say, an ADB is deactivated so that it can be investigated. Thus, it is possible to have a first event relating to a fault and a second event relating to maintenance of an ADB or any other combination of events.

In a preferred example one considers an aircraft comprising 1000 stations. The stations are linked in cascade in groups of ten to a bus. The buses are linked as in the invention. That is to say an ADB can be found on either side of the ends of the bus. Thus, during normal operation, 40 stations are linked in cascade to the four upstream inputs/outputs of an ADB. Thus, 26 ADBs are used in such a network. In this case if one envisages a useful bit rate of the order of 10 Mbits/s per station then one must envisage a bit rate of 10×10=100 Mbits/s per bus. Thus an upstream or downstream input/output of an ADB must be able to supply information with a bit rate of the order of 100 Mbits/s. Knowing that a maximum bit rate is obtained when an ADB is operating with its upstream inputs/outputs and its downstream inputs/outputs active then the maximum bit rate is of the order of 8×100 Mbits/s=800 Mbits/s. However, in a preferred example the device of the invention is constructed so as not to have to dimension cables at 800 Mbits/s but on the contrary to be able to limit oneself to 500 Mbits/s.

During fault-free operation the primary stream has a bit rate of the order of 400 Mbits/s. When faults occur, a surge in bit rate of a primary stream will vary from 0%, in a case of a single fault, up to 100%, in the case where a single ADB is operational between two faulty ADBs. Conversely, in the case where two faulty ADBs are sufficiently far apart the bit rate surge applied to the various primary streams of the relevant ADBs reaches only 25%. The primary streams of the network 1 will therefore be substantially equivalent to within 25%.

In this preferred example stations are linked in cascade to a bus constructed in compliance with the IEEE 1394 standard. That is to say the buses are constructed from cables with two twisted conductors and a maximum bit rate flowing over these buses is of the order of 100 Mbits/s. This preferred example constitutes no limitation whatsoever of the invention. Moreover, the device of the invention and/or its process can be used in any network comprising at least two ADBs.

The invention claimed is:

1. A network for distributing information, between a central unit and stations, comprising:
    information splitting devices with inputs/outputs connected to the central unit and to the stations, an interface device in each station,
    wherein the interface device of each station is linked to a first splitting device and to a second splitting device by the interface device of at least one additional station,
    wherein protocol exchanges between the central unit and the interface device are organized such that the central unit can determine whether a terminal is faulty, an interface is faulty, or the splitting device is faulty, and
    wherein each splitting device is configured to support a higher bit rate than the nominal bit rate of the splitting device, and
    when the central unit determines that the terminal, the interface or the splitting device is faulty, a network load is distributed to each non-faulty splitting device such that the bit rate increase in each non-faulty splitting device is less than the nominal bit rate.

2. The network as claimed in claim 1, wherein plural interface devices are mounted in cascade on a link starting from a splitting device.

3. The network as claimed in claim 1, wherein an interface device comprises a means for detecting a fault relating to a problem on a link between this interface device and the first or the second splitting device.

4. The network as claimed in claim 3, wherein the means for detecting faults comprises means for mutual acknowledgement with the central unit.

5. The network as claimed in claim 1, further comprising a device for switching over from the first splitting device to the second splitting device.

6. The network as claimed in claim 5, wherein the switching device is in the central unit.

7. The network as claimed in claim 1, wherein a link between a splitting device and an interface device is effected with a cable having two twisted conductors.

8. The network as claimed in claim 1, wherein a splitting device is linked by a link connected to one of its inputs/outputs to a single special interface device, this special interface device being linked by another link connected to another input/output of another splitting device.

9. The network as claimed in claim 1, wherein addresses used to identify elements of the network comprise fields of which a first field makes it possible to identify a group of stations connected to a splitting device identified by a second field and that a modification of a value of the second field makes it possible to connect the group of stations to another splitting device.

10. The network as claimed in claim 1, wherein the splitting device is capable of supporting a bit rate of two times a nominal bit rate of the splitting device.

11. A process for splitting the effects of a fault in a network for distributing information among terminals, wherein
    N splitting devices are linked, according to a star topology, to a central unit with an aid of transport means over each of which a primary stream travels, to a splitting device of rank m corresponding to a primary stream $FP_m$,
    the splitting devices are furnished with first inputs/outputs $A_1$ to $A_i$ and with second inputs/outputs $B_1$ to $B_j$,
    the first inputs/outputs $A_1$ to $A_i$ of a splitting device K are linked by buses $K_1$ to $K_i$ to the second inputs/outputs $B_1$ to $B_j$ of a consecutive splitting device K+1, with $1 \leq K \leq N$,
    terminals are linked in cascade to each bus $K_1$ to $K_i$,
    the first inputs/outputs $A_1$ to $A_i$ of the splitting devices 1 to N are activated,
    upon a fault between a terminal linked by a splitting device K to the central unit, a first input/output $A_1$ to $A_i$ of the splitting device K is deactivated,
    a second input/output $B_1$ to $B_j$ of the splitting device K+1 is activated.

12. The process as claimed in claim 11, wherein
    upon an event relating to the splitting device K, the first inputs/outputs $A_1$ to $A_i$ of the splitting devices K+1 to N are deactivated, the second inputs/outputs $B_1$ to $B_i$ of the splitting devices K+1 to N are activated.

13. The process as claimed in claim 11, wherein
upon a fault, some of the first inputs/outputs $A_1$ to $A_i$ of the splitting device K+1 are activated.

14. The process as claimed in claim 11, wherein
upon another event relating to a splitting device K±n, a number of first inputs/outputs and a number of second inputs/outputs to be activated for each of a number of devices available between the splitting devices K and K±n are determined as a function of these available devices, this number being different by one unit at most between two available devices,
inputs/outputs thus determined from among the inputs/outputs $A_1$ to $A_i$ and or $B_1$ to $B_i$ are activated.

15. A network for distributing information, between a central unit and stations, comprising:
information splitting devices with inputs/outputs connected to the central unit and to the stations, each station includes an interface device,
wherein the interface device of each station is linked to a first splitting device and to a second splitting device via an interface device of at least one additional station,
wherein plural interface devices are mounted in cascade on a link starting from a splitting device, and
wherein each splitting device is configured to support a higher bit rate than the nominal bit rate of the splitting device, and
when the central unit determines that a station or splitting device is faulty, a network load is distributed to each non-faulty splitting device such that the bit rate increase in each non-faulty splitting device is less than the nominal bit rate.

16. The network as claimed in claim 15, wherein an interface device comprises a means for detecting a fault relating to a problem on a link between this interface device and the first or the second splitting device.

17. The network as claimed in claim 16, wherein the means for detecting faults comprises means for mutual acknowledgement with the central unit.

18. The network as claimed in claim 15, further comprising a device for switching over from the first splitting device to the second splitting device.

19. The network as claimed in claim 18, wherein the switching device is in the central unit.

20. The network as claimed in claim 15, wherein a link between a splitting device and an interface device is effected with a cable having two twisted conductors.

21. The network as claimed in claim 15, wherein a splitting device is linked by a link connected to one of its inputs/outputs to a single special interface device, this special interface device being linked by another link connected to another input/output of another splitting device.

22. The network as claimed in claim 15, wherein addresses used to identify elements of the network comprise fields of which a first field makes it possible to identify a group of stations connected to a splitting device identified by a second field and that a modification of a value of the second field makes it possible to connect the group of stations to another splitting device.

23. The network as claimed in claim 15, wherein the splitting device is capable of supporting a bit rate of two times a nominal bit rate of the splitting device.

* * * * *